May 17, 1960 V. WASSILIEFF 2,936,638
VARIABLE SPEED FRICTION DRIVE
Filed March 25, 1953 4 Sheets-Sheet 1

Inventor
V. Wassilieff

May 17, 1960 V. WASSILIEFF 2,936,638
VARIABLE SPEED FRICTION DRIVE
Filed March 25, 1953 4 Sheets-Sheet 2

Inventor
V. Wassilieff

May 17, 1960 V. WASSILIEFF 2,936,638
VARIABLE SPEED FRICTION DRIVE
Filed March 25, 1953 4 Sheets-Sheet 3

Inventor
V. Wassilieff

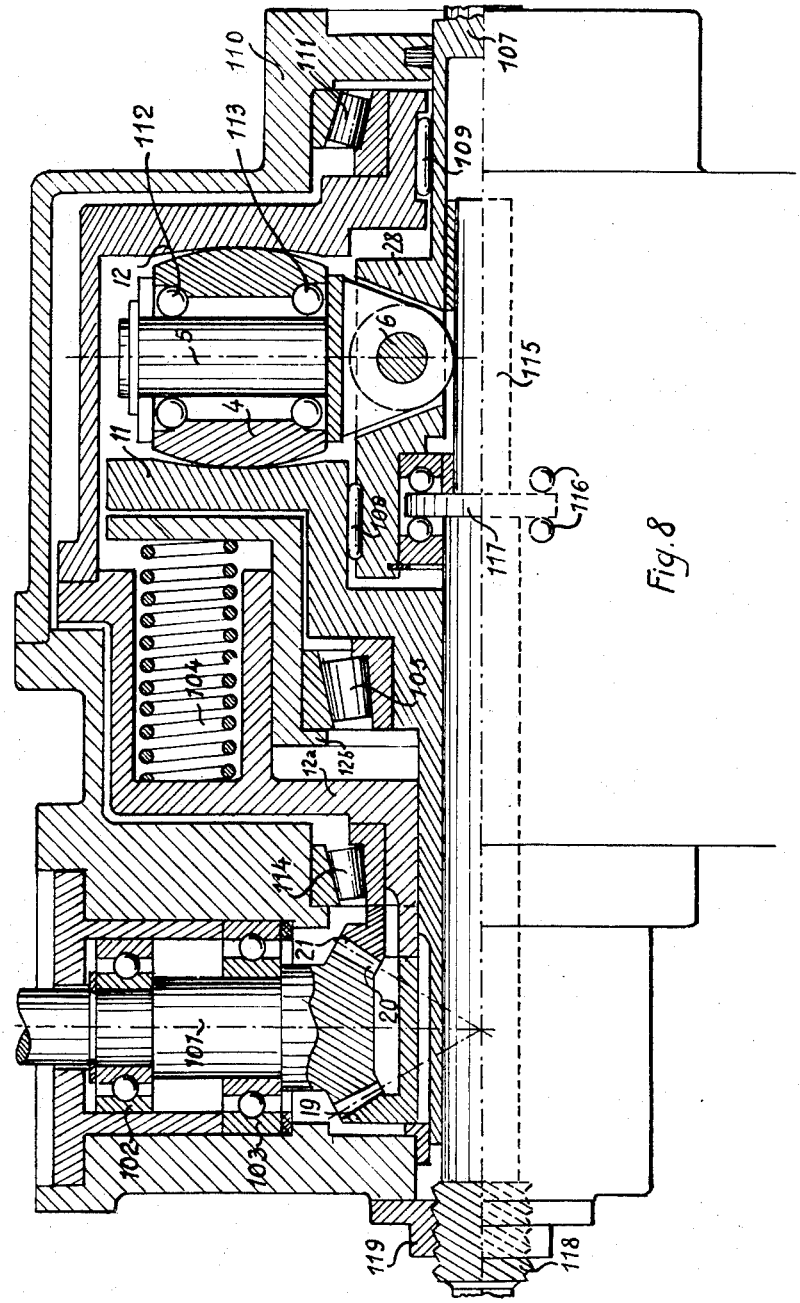

United States Patent Office 2,936,638
Patented May 17, 1960

2,936,638

VARIABLE SPEED FRICTION DRIVE

Victor Wassilieff, Paris, France

Application March 25, 1953, Serial No. 344,491

Claims priority, application France April 1, 1952

13 Claims. (Cl. 74—200)

This invention relates to variable speed drive of the friction type in which one or more friction rollers are interposed between two friction discs to transmit a drive with a ratio which is continuously variable within given limits, the variation of said ratio being obtained by modifying the rolling radii of the rollers on the discs.

In the known drives of this type, the same circumference of contact is used on each roller by both discs and the contact radii are varied by pivoting each roller in a diametrical plane of the discs around an articulation axis located at, or substantially at, its center.

It is clear that, with this arrangement, to provide a wide range of variation of the speed ratio, the rollers should be given a large relative diameter with respect to that of the discs, while large angles of inclination of the rollers about their respective articulation axis must be provided.

These two requirements result in a limitation of the number of rollers, so that this type of friction drive is not capable of transmitting large torques.

Moreover, the simultaneous inclination of the rollers which is obtained by acting directly upon the same implies the use of complicated mechanism and the use of a stationary supporting member on which the rollers must be articulated.

An object of this invention is to provide a variable speed friction drive of the type described, in which each friction disc cooperates with an individual circumference of contact on each roller, the variation of the speed ratio being obtained by displacing at least one of the circumferences of contact on each roller along the generatrices of the latter, which permits obtaining a wide range of variation with a small maximum angle of inclination of the rollers and with a diameter of the same as small as desired.

This arrangement offers a number of advantages:

First of all, the reduced relative diameter of the rollers, with respect to that of the discs, permits using as many rollers as required to transmit considerable torques.

Moreover, it is not even necessary to act directly upon the rollers to cause their inclination, the same being ensured, if desired, by a relative axial displacement either between one of the discs and the rollers or between both discs. This permits articulating the rollers, if desired, on a rotating member coaxial with the discs to provide a sun-and-planet friction gear which may be used in the same manner and with the same wide range of applications as an epicyclic gear train (differential transmission, etc.), but with the additional advantage that the transmission ratio between each sun-wheel and the planet-carrier is variable within a wide continuous range. This arrangement moreover provides a variable speed drive in which the speed can be varied from a finite value to zero, with a substantially constant efficiency.

Still another advantage of this arrangement is to permit suppressing the above-mentioned complicated control mechanisms and, hence, reducing considerably the cost of the device.

Another object of the invention is to duplicate the above-described friction drive, which permits suppressing any axial thrust of the rotating members on their axial abutments.

Other objects and advantages of the invention will be apparent from the following detailed description, together with the accompanying drawings, submitted for purposes of illustration only and not intended to define the scope of the invention, reference being had for that purpose to the subjoined claims.

In these drawings:

Fig. 8 is an axial sectional view of a constructive embodiment corresponding to Fig. 4.

Figure 1:
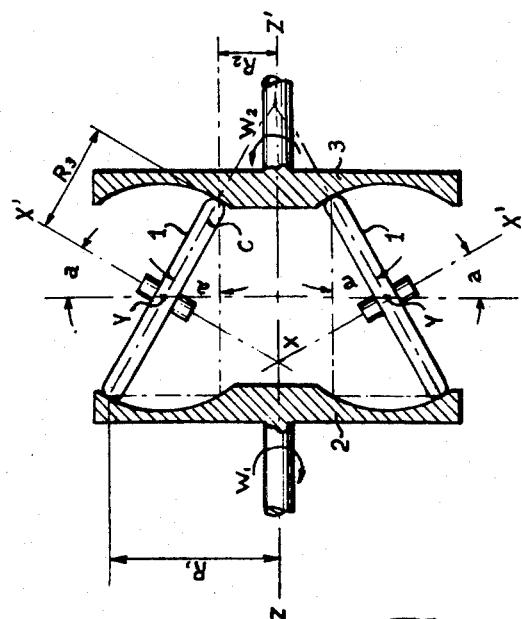
Fig. 1 is a diagrammatic view showing the principle of a known variable speed friction drive.

Referring first to Fig. 1, there are shown at 1, flat rollers, each of which has its rotation axis XX′ articulated around another axis (diagrammatically shown at point Y) right-angled with axis XX′ and with the common axis ZZ′ of two friction discs 2 and 3.

This device is completed by means (not shown) for pressing discs 2 and 3 into frictional contact with a common circumference of contact on the periphery of the flat rollers 1.

It is clear that, if the inclination of the axis XX′ of each roller is varied, the ratio between the rolling radii R1 and R2 of said roller on the discs 2 and 3, respectively, is modified so that, e.g., if disc 2 rotates with a constant speed W1, disc 3 will be imparted with a variable speed W2 which is equal to $$W1 \times \frac{R1}{R2}$$

On the other hand, R3 being the radius of a roller 1, it may be written that:

R1=R2+2R3 sin $a$, $a$ being the angle of inclination of the plane of rotation of the roller relative to axis ZZ′.

Thus, the transmission ratio R1/R2 is a function of the diameter 2R3 of the rollers and of the angle of inclination $a$ of said rollers, so that a given range of variation implies a given diameter and a given maximum value of said angle of inclination.

For example, if the maximum transmission ratio is to be 1/3, assuming a maximum inclination angle of 30°, and thus $$\sin a \; \max = \frac{1}{2}$$

it may be written that $$R2 = \frac{1}{2} R3 \text{ and } R1 = 3R2 = \frac{3}{2} R3$$

In these conditions, it may be easily shown that the maximum number of rollers to be interposed between the friction discs is limited to three.

With only three points of contact, it is clear that only a comparatively small torque can be transmitted.

Figure 2:
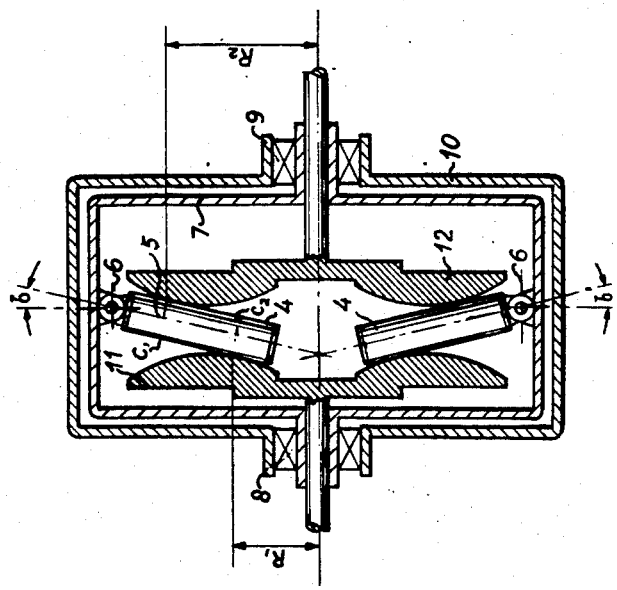
Fig. 2 is a comparative diagram of a variable speed friction drive according to the invention.

Fig. 2 is a diagrammatic view showing the principle of the friction drive according to the invention.

In this figure, it may be seen that in a drive according to the invention, the ratio between the rolling radii does not depend on the diameter of the rollers, but only on the relative curvatures of the contact surfaces.

In these conditions, it is clear that the diameter of the rollers can be considerably reduced, which permits providing as many rollers as desired to ensure the transmission of a given torque.

In Fig. 2, the elongated rollers are indicated at 4. The rotation axis 5 of each roller is pivoted at one end of the roller at 6 on a support 7 which may be either stationary or rotatably journalled in bearings 8 and 9 of a casing 10. Disc 11, on one side of rollers 4, and disc 12, on the other side thereof, are urged into contact pressure against said rollers by any suitable means (not shown). The axes of rotation of discs 11 and 12 are aligned and support 7, when it is rotatable, has the same axis of rotation. By adjusting the relative axial positions of at least two of the three members 7, 11 and 12 by any suitable means (not shown), the inclination of the rotation axes 5 of rollers 4 and, thus, the ratio between the rolling radii R1 and R2 of discs 11 and 12 on rollers 4 can be varied at will.

On the other hand, it is clear that if the curvatures of discs 11, 12 and the generatrices of rollers 4 are but slightly different a very small angle of inclination $b$ will determine an important relative shift of the two circumferences of contact C1, C2 on each roller and consequently a considerable variation of the transmission ratio between discs 11 and 12. In other words, the range of inclination of the rollers may be selected at will by giving the discs and rollers suitable relative curvatures. Now, if said range is sufficiently narrow, the articulation axis of the rollers may be located at either end thereof without requiring considerable maximum axial relative displacement of the discs.

It is to be understood that support 7 and discs 11 or 12 may be used separately or in any combination as driving or driven member or members.

For example, support 7 may be imparted with a variable rotation speed either by driving one of the discs while holding the other one stationary, or by driving both discs in the same way or in opposite ways.

It is also possible to drive support 7 to cause rotation at a variable speed of the disc axles.

Finally, as in the known friction drives support 7 being held stationary, one of the discs may be driven to cause rotation of the other one at a variable speed.

Figures 3, 4, 5:
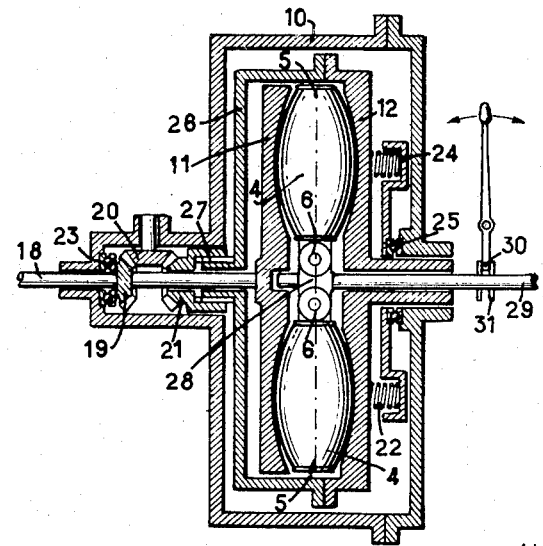
Fig. 3 is an illustrative diagram of one embodiment, in which a friction drive according to the invention is used as a differential having one fixed sun-wheel.
Fig. 4 is an alternative embodiment of Fig. 3, in which the two discs are driven from the engine in opposite ways.
Fig. 5 shows another alternative embodiment in which the planet-carrier is driven from the engine.

Fig. 3 shows an embodiment in which one of the discs, as shown disc 11, is fast with casing 10, springs 13 housed in said casing pressing said disc upon the rollers 4. The other disc 12 which is journalled in a bearing 14 of casing 10 is prevented, by means of an axial thrust bearing 15, from moving axially under the action of springs 13.

The axis of rotation of each roller is articulated at one end at 6 on support 7.

The axle 16 of the rotatable support 7 is housed in a bearing 17 of casing 10; if either support 7 or disc 12 is driven, the other one of these two members is then imparted with a rotation speed which may be varied within a continuous range by displacing axially the support 7 in either direction. Said axial displacement is controlled by any suitable device (not shown).

It may be seen on the drawing that, in this embodiment, the rollers have been given a concave curvature, while the discs are convex and that the articulation axes 6 have been disposed at the outer end of the rollers.

In the embodiment shown in Fig. 4, the discs 11 and 12 are driven in opposite ways, the axle 18 of disc 11 being directly rotated from the engine, while disc 12 is driven through a bevel pinion 19 keyed on axle 18, a bevel pinion 20 journalled in casing 10 and a bevel pinion 21 rotatively fast with disc 12.

Disc 12 is urged into contact with rollers 4 by means of springs 22, while the other disc 11 is held in its axial position by a ball thrust bearing 23. Springs 22 are housed in grooves provided on a plate 24 rotatively fast with disc 12 and abutting against a ball thrust bearing 25 in casing 10. An inner casing 26 is fast with disc 12 and its splined hub 27 cooperates with a conjugated splined portion of pinion 21, so as to permit relative sliding therebetween; with this arrangement, disc 12, casing 26 and pinion 21 rotate as a whole.

As previously, rollers 4 have their rotation axis pivoted at one end around axes 6 fast with a hub 28 on shaft 29.

In the example shown in Fig. 4, rollers 4 have been given the shape of barrels, while the rolling areas on the discs are concave, the articulation axes 6 of the rollers being located near shaft 29.

The operation of this device is as follows:

Discs 11 and 12 are rotated from the engine at the same speed in opposite ways. In the main position of the rollers shown in the drawing in which the rolling radii on the two discs and, thus, the circumferential driving speeds of said discs are equal to one another, rollers 4 are not rotated around the axes 5 without causing any rotation of shaft 29.

More generally, in a device in which the angular speed of disc 11 is different from that of disc 12, the mean position of the rollers in which shaft 29 remains stationary is that for which the rolling radii on the discs are inversely proportional to the angular speeds of the discs:

$$\frac{W1}{W2}=\frac{R2}{R1}$$

In these conditions, if shaft 29 is displaced axially by means of a suitable device such as diagrammatically shown in Fig. 4, in the form of a hand lever 30 engaged in a ring 31, axes 5 are tilted about axes 6, while discs 12 and 11 are forced away from one another against the action of springs 22.

The rolling radii of discs 11 and 12 and, hence, the circumferential driving speeds of the two discs become different from one another.

Rollers 4, axes 5 and, hence, shaft 29, are driven in the same way as that disc which has the greater circumferential speed, the speed of rotation of shaft 29 depending on the rolling radii of rollers 4 on both discs.

It may be shown that the angular speed WR of shaft 29 is directly proportional to the difference between the rolling radii of the discs:

$$WR=Wm\frac{R1-R2}{R1+R2}$$

W$m$ being the angular speed, R1 and R2 being the rolling radii of the discs.

On the other hand, since the two discs are interconnected through a differential gear 19, 20 and 21 and since that disc which has the gerater rolling radius drives the other disc, it may be shown that, for any resisting torque acting upon the driven member, the power taken off the engine remains constant.

Fig. 5 shows another embodiment of the invention in which member 7 which supports rollers 4 is driven from the engine, discs 11 and 12 being rotatively fast with two output shafts 32 and 33, respectively.

In the example shown, the drive is transmitted from the engine through two bevel pinions 34 and 35, so that the driving shaft 36 is right-angled with the two output shafts 32 and 33. Thus, the general arrangement of the elements in this embodiment is similar to that of a motorcar differential gear.

In this example, the drive operates as follows: in the mean position of the rollers in which the rolling radii are equal to one another, both discs are driven from the rollers at a same speed equal to that of support 7, assuming that the resisting torques acting upon the axles of both discs are also equal to one another.

In the case when the torques on the wheels are unbalanced, the drive acts as a differential gear. If one of the discs is displaced axially in either direction, the ratio between the rolling radii is varied and the equal resisting torques acting upon both disc axles result in tangential resisting forces inversely proportional to said radii. That disc which is affected by the smaller tangential force is driven at a higher speed than the other one, proportionally to the rolling radii.

It may be shown that such a drive incorporated in a motorcar may be used advantageously not only as a differential, but, moreover, as a steering device. For this purpose, it suffices to drive both rear driving wheels of the car from the two output shafts of the variable speed drive and to act, by a suitable control, on the relative axial position of the discs with respect to the rollers to thereby impart the driving wheels with either equal or different rotation speeds. If the two driving wheels are imparted with different rotation speeds, the motorcar tends to turn on the side of the slower wheel. In this example, rollers 4 have been given the shape of half-barrels. With this arrangement, only one of the two points of contact between each roller and the discs is shifted along the generatrix of the roller when the same is inclined with respect to the mean position shown in Fig. 5.

Figure 6:
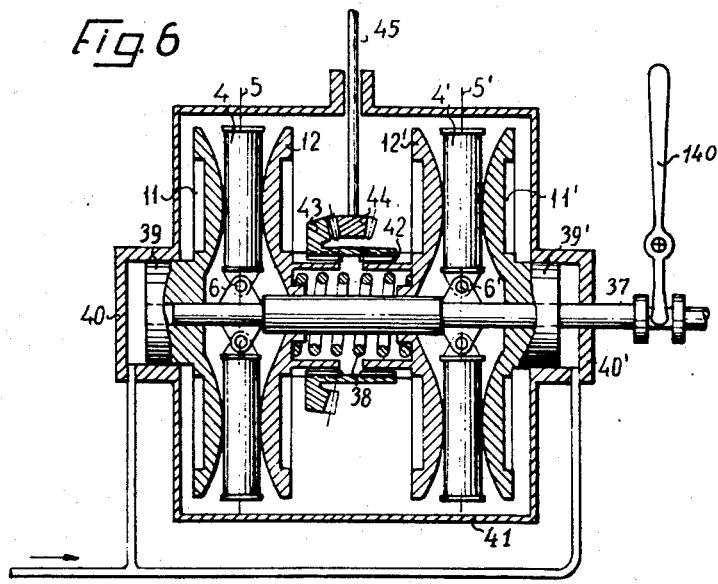
Fig. 6 shows a further embodiment in which the friction drive is duplicated.

Fig. 6 shows an embodiment in which a drive of the type shown in Fig. 3 has been duplicated. This arrangement permits, on the one hand, doubling the power transmitted, while using a contact variable speed drive and, on the other hand, the elimination of any axial thrust of the rotating elements on their bearings.

Referring to Fig. 6, there are shown at 11 and 12, 11' and 12', two pairs of discs between which are frictionally clamped rollers 4 and 4' rotating around axes 5 and 5'. The latter are articulated at one end at 6 and 6' on shaft 37.

A spring 38 interposed between discs 12 and 12' tends to take them apart and to incline rollers 4 and 4' outwardly. This action of spring 38 is counteracted by the discs 11 and 11' which are urged towards one another by any suitable means.

In the example shown in Fig. 6, the hubs of discs 11 and 11' have been given the shape of pistons 39 and 39' slidably mounted respectively in cylinders 40 and 40' provided in casing 41.

Hydraulic, pneumatic, or similar means, are provided to build up a variable fluid pressure in cylinders 40 and 40', said pressure being transmitted through pistons 39 and 39' onto discs 11 and 11', respectively.

With this arrangement, if the pressure in cylinders 40 and 40' is suitably varied, e.g., by means of a hand-lever 140, discs 11 and 11' may be displaced to allow the simultaneous tilting of rollers 4 and 4' about a desired angle.

Discs 12 and 12' which are freely movable in both axial directions are rotated through their splined portions meshing with the conjugated splines of hub 42 of pinion 43. The latter meshes in turn with another pinion 44 keyed on shaft 45.

This device operates in a similar manner as that of Fig. 3. Thanks to the pairwise arrangement of the elements, no axial thrust is transmitted from the rotating members to their bearings.

Figure 7:
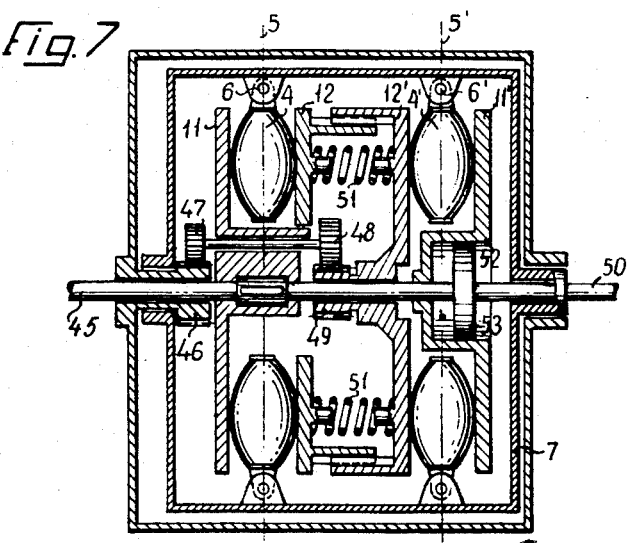
Fig. 7 is a diagrammatic view of another duplicated friction drive, in which the two discs of each pair are driven from the engine in opposite ways.

Referring now to Fig. 7, there are shown at 11, 12, 11', 12' two pairs of discs which are rotated from a shaft 45 at the same speed and in opposite ways, thanks to the interposition of a differential gear comprising a stationary spur pinion 46, planet-wheels 47 and 48 journalled in disc 11 and a pinion 49 rotatively fast with disc 12'. Discs 11 and 11', on the one hand, and discs 12 and 12', on the other hand, are interconnected pairwise through convenient interengaging splined portions, this arrangement permitting axial relative displacements between the discs of each pair.

Rollers 4 and 4' which rotate around axes 5 and 5' are articulated at 6 and 6' on the rotating support 7 which is keyed on the output shaft 50. Suitable means are provided to ensure frictional clamping of rollers 4 and 4' between discs 11, 12 and 11', 12', respectively.

In the example shown in Fig. 7, discs 12 and 12' are repelled from one another under the action of springs 51, while discs 11 and 11' are urged towards one another under the action of a pressure fluid contained in a cylinder 52 integral with disc 11', said pressure fluid acting upon a piston 53 fast with shaft 45 and, hence, with disc 11.

It will be easily understood that, in that relative position of the rotating members in which the rolling radii on each pair of discs are equal to one another, rollers 4 are rotated around their axes without transmitting any drive to support 7 and the output shaft 50.

In any other relative position of the rotating members produced by pressure variations in cylinder 52, rollers 4 are caused to take a certain inclination, which causes, in turn, a rotation of the output shaft at a speed which is a function of the position of piston 53 in cylinder 52. It may be seen, in Fig. 7, that all axial thrust on the corresponding elements of the two units of the duplicate drive are equal and opposite and, hence, compensate each other, so that none of the rotating members exerts any resultant pressure on its bearings.

The constructive embodiment shown in Fig. 8 comprises the same essential elements in the diagrammatic view of Fig. 4 and said essential elements have been designated by the same reference numbers.

In the example shown in Fig. 8, pinion 20 is keyed on a driving shaft 101 which is journalled in two ball bearings 102 and 103. Disc 12 comprises two members slidably mounted in one another, as shown in 12a, 12b, said members being urged apart from one another by means of springs 104. Member 12b of disc 12 is journalled on disc 11 through a combined axial and radial bearing 105. Disc 11 is journalled in turn on the hub 28 of an output shaft 107 through a needle bearing 108. Disc 12 is journalled on said output shaft 107 through a needle bearing 109 and in casing 110 through a combined radial and axial bearing 111. Each roller 4 is journalled on its rotation axle 5 through two ball bearings 112, 113. Finally, part 12a of disc 12 is journalled on casing 110 through a combined radial and axial bearing 114. The control of the inclination of the rollers 4 is ensured by means of a rod 115 on which hub 28 is journalled by means of a double thrust ball bearing 116 between the two rows of balls of which is interposed a flange 117 of rod 115.

As shown above, a very small inclination of the rollers is sufficient to determine an important variation of the rotation speed of the planet-wheel carrier and, hence, of output shaft 107. This requires a very accurate control of said inclination. In the example shown in Fig. 8, this control is micrometric and is obtained by screwing more or less a threaded portion 118 of rod 115 in a fixed nut 119 attached to casing 110. In this specific embodiment, the above indicated formula shows that, in the mean position of the rollers shown in Fig. 8, since $R1=R2$, $$WR = Wm \times \frac{0}{2R} = 0$$

while, in the maximum inclined position, if $R2=2R1$, $$WR = Wm \times \frac{R}{3R} = \frac{Wm}{3}$$

It is to be understood that the invention is not intended to be limited to the examples shown and described, nor otherwise than defined in the appended claims.

In particular, the shape of the friction surfaces of the rollers and the discs may be very widely varied within the scope of the invention, the only required condition being that the relative curvatures of said friction surfaces must be such that each roller has in any position two diametrically opposed generatrices each innerly tangent to one of the discs at only one point.

What is claimed is:

1. In a variable speed friction drive, the combination, with two coaxial friction disk members urged towards one another by resilient means and a roller supporting member coaxial with said disk members, of a plurality of elongated friction rollers arranged between said disk members in star-like formation and articulated at one end on said supporting member and means to shift at least one of two of said members axially with respect to the third one against the action of said resilient means, so as to tilt said rollers simultaneously to thereby vary at least one of the rolling radii of each one of said rollers on said disk members and, hence, the transmission ratio between the latter.

2. In a variable speed friction drive, the combination with two coaxial friction disk members urged towards one another by resilient means and a rotatable member coaxial with said disk members, of a plurality of elongated friction rollers arranged between said disk members and having one end articulated to said rotatable member, and means to shift at least one of two of said members axially with respect to the third one against the action of said resilient means, so as to tilt said rollers simultaneously to thereby vary at least one of the rolling radii of each one of said rollers on said disk members and, hence, the transmission ratios between said members.

3. A variable speed drive of the friction type comprising two coaxial friction disk members, a plurality of elongated rollers so positioned between said disk members as to have two diametrically opposed generatrices in continuous frictional engagement, each with one of said disk members at only one point, a common supporting rotatable member for said rollers coaxial with said disk members, said rollers being articulated at one end on said supporting member each around an axis longitudinally offset on its rotation axis with respect to its mid-transverse axis and substantially orthogonal with the common axis of said disk members, one of said three members being stationary in axial direction, resilient means to urge said disk members towards one another to ensure operational frictional pressure between said rollers and disk members and means to shift at least one of the two other of said members axially with respect to said stationary member, so as to simultaneously vary the orientation of the rotation axis of each of said rollers around its articulation axis to thereby vary the rolling radii of said rollers on said disk members and, hence, the transmission ratios between said three members.

4. A variable speed friction drive according to claim 3, in which at least one of the three contact surfaces between each of said rollers and the two disk members is convex.

5. A variable speed friction drive according to claim 4, in which each one of said disk members has a plane friction surface, while the generatrices of said rollers are convex.

6. A variable speed friction drive according to claim 4, in which the friction surface of each disk member is constituted by a concave annular groove, while the generatrices of said rollers are convex, the radius of curvature of said generatrices being smaller than that of said groove.

7. A variable speed friction drive according to claim 4, in which the friction surface of each one of said disks is constituted by a convex annular embossing, while the generatrices of said rollers are rectilinear.

8. A variable speed friction drive according to claim 4, in which the friction surface of each of said disks is constituted by a convex annular embossing, while the generatrices of said rollers are concave, the radius of curvature of said embossing being smaller than that of said generatrices.

9. A variable speed friction drive according to claim 3, in which the relative shapes of the generatrices of said rollers and the friction surfaces of said disk members are such that the inclination of said rollers in either direction determines a shift of only one of the two contact points of each one of said rollers on said disk members along the corresponding roller generatrix.

10. A variable speed friction drive according to claim 3, in which said disk members are driven at the same speed and in opposite ways whereby said rotatable member is imparted with a speed of rotation varying as a function of the inclination of said rollers.

11. A variable speed friction drive according to claim 3, in which said rotatable member is driven whereby said disk members are rotated in the same way at speeds of which the ratio varies as a function of the inclination of said rollers.

12. A friction transmission comprising two coaxial variable speed friction drives according to claim 1, wherein said resilient means urges one disk member of each drive towards the other disk member of the corresponding drive, and wherein control means are provided to shift the two other disk members simultaneously in opposite axial directions against the action of said resilient means to tilt simultaneously all rollers of both drives.

13. In a variable speed friction drive mechanism, three rotatable coaxial elements at least two of which are axially displaceable relative to the third element, namely two discs having mutually facing friction surfaces and a roller carrier having a cylindrical supporting surface extending substantially perpendicular to said friction surfaces in radially spaced relation thereto, a plurality of elongated drive transmitting friction rollers extending radially between said discs and articulated at one end to said supporting surface so as to be tiltable in a longitudinal direction, said rollers having their peripheries adapted to engage said friction surfaces in a single circle of contact when their axes are perpendicular to said supporting surface, and in two separate circles of contact with respect to said friction surfaces when their axes are inclined with respect to said supporting surface, means for axially moving at least one of said elements with respect to the others to thereby cause said rollers to be tilted about their articulation axes to produce corresponding changes in driving ratio between said discs or between said carrier and said discs, and means for maintaining said discs in frictional contact with said rollers in all angular positions of the latter.

References Cited in the file of this patent

UNITED STATES PATENTS

| | | |
|---|---|---|
| 725,899 | Watt | Apr. 21, 1903 |
| 1,394,932 | Murphy | Oct. 25, 1921 |
| 1,844,703 | Thompson | Feb. 9, 1932 |
| 1,979,170 | Nardone | Oct. 30, 1934 |
| 2,040,833 | Chilton | May 19, 1936 |
| 2,560,180 | Lesueur | July 10, 1951 |
| 2,580,990 | Bannister | Jan. 1, 1952 |

FOREIGN PATENTS

| | | |
|---|---|---|
| 605,479 | Great Britain | July 23, 1948 |